(12) United States Patent
Lee et al.

(10) Patent No.: US 10,721,103 B2
(45) Date of Patent: Jul. 21, 2020

(54) SIGNAL RECEIVING DEVICE AND EQUALIZER TUNING METHOD THEREOF

(71) Applicant: ALi Corporation, Hsinchu (TW)

(72) Inventors: Ming-Ta Lee, Hsinchu (TW); Hsu-Che Nee, Hsinchu (TW)

(73) Assignee: ALI CORPORATION, Hsinchu (TW)

( * ) Notice: Subject to any disclaimer, the term of this patent is extended or adjusted under 35 U.S.C. 154(b) by 0 days.

(21) Appl. No.: 16/450,661

(22) Filed: Jun. 24, 2019

(65) Prior Publication Data

US 2020/0052933 A1 Feb. 13, 2020

(30) Foreign Application Priority Data

Aug. 10, 2018 (CN) .......................... 2018 1 0911342

(51) Int. Cl.
*H03H 7/03* (2006.01)
*H04L 25/03* (2006.01)

(52) U.S. Cl.
CPC .................. *H04L 25/03057* (2013.01); *H04L 2025/03668* (2013.01)

(58) Field of Classification Search
CPC . H04L 27/01; H04L 25/03267; H04L 7/0058; H04L 25/0325; H04L 25/03038; H04L 2025/0349; H04L 25/03885; H04L 2025/03808; H03H 21/0043; H04B 3/23
USPC ............... 375/229, 231, 233; 708/322, 323
See application file for complete search history.

(56) References Cited

U.S. PATENT DOCUMENTS

| 7,577,193 | B2 | 8/2009 | Goth | |
|---|---|---|---|---|
| 2006/0002462 | A1* | 1/2006 | Park | H04L 25/03012 375/232 |
| 2010/0254489 | A1* | 10/2010 | Citta | H04L 1/0057 375/299 |
| 2016/0080178 | A1* | 3/2016 | Chen | H04L 25/03057 375/233 |
| 2017/0222848 | A1* | 8/2017 | Sun | H04L 7/0012 |

FOREIGN PATENT DOCUMENTS

TW I543571 7/2016

* cited by examiner

*Primary Examiner* — Khai Tran
(74) *Attorney, Agent, or Firm* — J.C. Patents (57) ABSTRACT

A signal receiving device and an equalizer tuning method thereof are provided. A first equalizer receives an input signal and generates a first equalized signal by compensating the input signal according to a first equalization parameter. A second equalizer generates a second equalized signal by compensating the first equalized signal according to a second equalization parameter. A clock and data recovery circuit recovers the second equalized signal to generate an output signal. An equalizing controller receives the input signal and outputs a first control signal and a second control signal, to adjust the first equalization parameter according to the first control signal and adjust the second equalization parameter according to the second control signal. The equalizing controller detects a first pattern symbol and a second pattern symbol from the output signal and tunes the second equalization parameter according to the number of the first pattern symbol and the second pattern symbol.

19 Claims, 8 Drawing Sheets

The number of the first pattern symbol (='2') > The number of the second pattern symbol (='1')

FIG. 6A

The number of the second pattern symbol (='2') > The number of the first pattern symbol (='1')

FIG. 6B

The number of the second pattern symbol (='0') = The number of the first pattern symbol (='0')

SIGNAL RECEIVING DEVICE AND EQUALIZER TUNING METHOD THEREOF

CROSS-REFERENCE TO RELATED APPLICATION

This application claims the priority benefit of China application serial no. 201810911342.7, filed on Aug. 10, 2018. The entirety of the above-mentioned patent application is hereby incorporated by reference herein and made a part of this specification.

BACKGROUND

Technique Field

The invention relates to a method for compensating a received signal by using an equalizer, and particularly relates to a signal receiving device and an equalizer tuning method thereof.

Description of Related Art

During a process of signal transmission, a signal in a transmission channel has a considerable attenuation and may be distorted due to channel effect. Therefore, an equalizer (EQ) is equipped in the signal receiving device to compensate the channel effect. Specifically, the equalizer is configured to compensate or eliminate signal distortion and/or signal attenuation caused by unideal channel effect in the process of signal transmission. Coming with an era of the high-speed signal transmission, high-speed signal transmission specifications using differential signals, such as high-resolution multimedia interface (HDMI) and display video interface (DP), have been widely used in computer devices or general consumer electronics. An adaptive equalizer is usually equipped inside the signal receiving devices using these high-speed signal transmission specifications to equalize the received signal. The adaptive equalizer compensates the channel effect based on the channel estimation result so as to reduce transmission error rate, such that the signal receiving device is able to correctly analyze and use the received data. In many high-speed signal transmission systems, the adaptive equalizer may regulate the setting of the equalizer according to a predetermined tuning mechanism after a connection between the signal transmitting device and the signal receiving device has been established.

However, many factors, such as the material and the length of the transmission cable and so on, may cause the received signal to exhibit varying degrees of attenuation and distortion. Besides, different transmission specifications respectively formulate different definitions of channel attenuation and different compensation amounts. Namely, the adaptive equalizer should be dedicately designed for different transmission environments and transmission specifications. When an adaptive equalizer dedicately designed for a specific transmission specification is utilized by another signal receiving device supporting a different transmission specification, the performance of the said another signal receiving device becomes poorer.

SUMMARY

Accordingly, the invention provides a signal receiving device and an equalizer tuning method thereof, which are compatible with different transmission specifications, such that the utilization of the equalizer is more flexible and unlimited.

An embodiment of the invention provides a signal receiving device including a first equalizer, a second equalizer, a clock and data recovery circuit and an equalization controller. The first equalizer receives an input signal and generates a first equalized signal by compensating the input signal according to a first equalization parameter. The second equalizer is coupled to the first equalizer and generates a second equalized signal by compensating the first equalized signal according to a second equalization parameter. The clock and data recovery circuit is coupled to the second equalizer and recovers the second equalized signal to generate an output signal. The equalization controller receives the output signal and outputs a first control signal and a second control signal to adjust the first equalization parameter according to the first control signal and adjust the second equalization parameter by the second control signal. The equalization controller detects a first pattern symbol and a second pattern symbol from the output signal and adjusts the second equalization parameter according to the number of the first pattern symbol and the number of the second pattern symbol in a counting period.

According to another aspect, the invention provides an equalizer tuning method, which includes the following steps. An input signal is received and a first equalized signal is generated by compensating the input signal according to a first equalization parameter by a first equalizer. A second equalized signal is generated by compensating the first equalized signal according to a second equalization parameter by a second equalizer. The second equalized signal is recovered to generate an output signal by a clock and data recovery circuit. A first pattern symbol and a second pattern symbol are detected from the output signal and the second equalization parameter is adjusted according to the number of the first pattern symbol and the number of the second pattern symbol in a counting period by an equalization controller. A first control signal and a second control signal are outputted by the equalization controller, to adjust the first equalization parameter according to the first control signal and adjust the second equalization parameter by the second control signal.

Based on the above description, in an embodiment of the invention, the first equalizer performs signal compensation according to the first equalization parameter, and the second equalizer performs signal compensation according to the second equalization parameter. The equalization controller adjusts the first equalization parameter and the second equalization parameter at the same time. Such that, the equalization controller can tune the first equalizer and the second equalizer in one single phase, thereby rapidly achieving optimization of signal compensation. Besides, the tuning convergence condition for setting the first equalization parameter and the second equalization parameter can be compatible with different transmission specifications.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
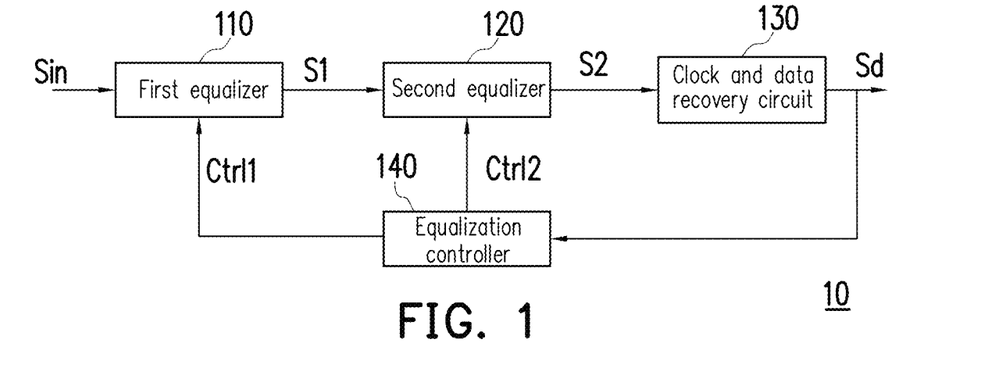
FIG. 1 is a block diagram of a signal receiving device according to an embodiment of the invention.

FIG. 1 is a block diagram of a signal receiving device according to an embodiment of the invention. Referring to FIG. 1, the signal receiving device 10 includes a first equalizer 110, a second equalizer 110, a clock and data recovery (CDR) circuit 130, and an equalization controller 140.

The first equalizer 110 receives the input signal Sin and generates a first equalized signal S1 by compensating the input signal Sin according to a first equalization parameter. The second equalizer 120 is coupled to the first equalizer 110 and generates the second equalized signal S2 by compensating the first equalized signal S1 according a second equalization parameter. In the present exemplary embodiment, the input signal Sin is a data signal, which is a differential signal configured for transmitting a series of data bits. Herein, each data bit refers to a bit "0" or "1". Generally, the input signal Sin received by the signal receiving device 10 may be attenuated or distorted due to channel effect, and the first equalizer 110 and the second equalizer 120 is configured to compensate the input signal Sin, so as to generate the second equalized signal S2 that has better signal quality and is beneficial to analysis.

Specifically, the first equalizer 110 may compensate the input signal Sin according to the compensation intensity determined by the first equalization parameter and may output the first equalized signal S1 which has been compensated, and the second equalizer 120 may compensate the first equalized signal S1 according to the compensation intensity determined by the second equalization parameter and may output the second equalized signal S2 which has been compensated, such that the channel effect in signal transmission is able to be compensated.

It should be noted that, the first equalizer 110 and the second equalizer 120 may be implemented by adaptive equalizers including a plurality of electronic components (e.g., capacitors, resistors, inductors, etc.). The first equalization parameter and the second equalization parameter may be, for example, resistance values of the resistors, capacitance values of the capacitors or the combination thereof. Namely, the compensation intensity of the first equalizer 110 and the second equalizer 120 for compensating signal may vary along with adjustment of the first equalization parameter and the second equalization parameter.

In the present exemplary embodiment, one of the first equalizer 110 and the second equalizer 120 may include a continuous-time linear equalizer (CTLE), and the other one of the first equalizer 110 and the second equalizer 120 may include a decision feedback equalizer (DFE). For instance, the first equalizer 110 may be a CTLE, and the second equalizer 120 may be a DFE.

The clock and data recovery circuit 130 is coupled to the second equalizer 120 and recovers the second equalized signal S2 to generate the output signal Sd. In the present exemplary embodiment, the clock and data recovery circuit 130 may sample the second equalized signal S2 to generate the output signal Sd. Besides, in one embodiment, the clock and data recovery circuit 130 may also perform a phase lock operation to generate a clock signal. Further, the clock and data recovery circuit 130 may sample the second equalized signal S2 according to the clock signal generated through the phase lock operation to generate the output signal Sd.

The equalization controller 140 receives the output signal Sd, and outputs a first control signal Ctrl1 and a second control signal Ctrl2 to adjust the first equalization parameter according to the first control signal Ctrl1 and adjust the second equalization parameter according to the second control signal Ctrl2. Specifically, the equalization controller 140 is configured to adjust the first equalization parameter of the first equalizer 110 and the second equalization parameter of the second equalizer 120. The equalization controller 140 controls the first equalization parameter and the second equalization parameter by using the first control signal Ctrl1 and the second control signal Ctrl2, so as to achieve the purpose of tuning the compensation intensity of the first equalizer 110 and the second equalizer 120 until the signals received by the first equalizer 110 and the second equalizer 120 satisfy a predetermined convergence condition.

In the present exemplary embodiment, in response to continuously inputting the input signal Sin, the clock and data recovery circuit 130 may continuously output a series of data bits (i.e., the output signal Sd). The equalization controller 140 may detects the first pattern symbol and the second pattern symbol from the output signal Sd. The first pattern symbol and the second pattern symbol are composed of a plurality of data bits arranged in a specific arrangement. Taking the output signal Sd generated by sampling the signal that is compensated insufficiently or excessively as example, the equalization controller 140 may search out the first pattern symbol and the second pattern symbol from a series of data bits of the output signal Sd in a counting period, and such specifics of implementation would be illustrated in detail in the following description. Therefore, the equalization controller 140 may count the number of the first pattern symbol appearing in the output signal Sd and the number of second pattern symbol appearing in the output signal Sd in the counting period. Afterward, the equalization controller 140 may adjust the second equalization parameter according to the number of the first pattern symbol and the number of second pattern symbol in the counting period to control the setting of the second equalization parameter via the second control signal Ctrl2.

It should be noted that, in one embodiment, the equalization controller 140 may also adjust the first equalization parameter according to the number of the first pattern symbol appearing in the data bits of the output signal Sd and the number of second pattern symbol appearing in the data bits of the output signal Sd. That is, the adjustment of the first equalization parameter may be performed through searching symbols having specific bit-patterns from the output signal Sd, though the invention is not limited thereto. In some other embodiments, the adjustment of the first equalization parameter may be performed based on other signals and other adjusting methods. For example, in another embodiment, the first equalization parameter may be adjusted according to the eye-pattern information (also referred as Eye Diagram) of the first equalized signal S1. Alternatively, in another embodiment, the first equalization parameter may be adjusted through sampling the first equalized signal S1 and searching the symbols having the specific bit-pattern. Accordingly, the equalization controller 140 may adjust the first equalization parameter and the second equalization parameter at the same time until the status of the output signal Sd (and the first equalized signal S1) satisfies the convergence condition.

Figure 2:
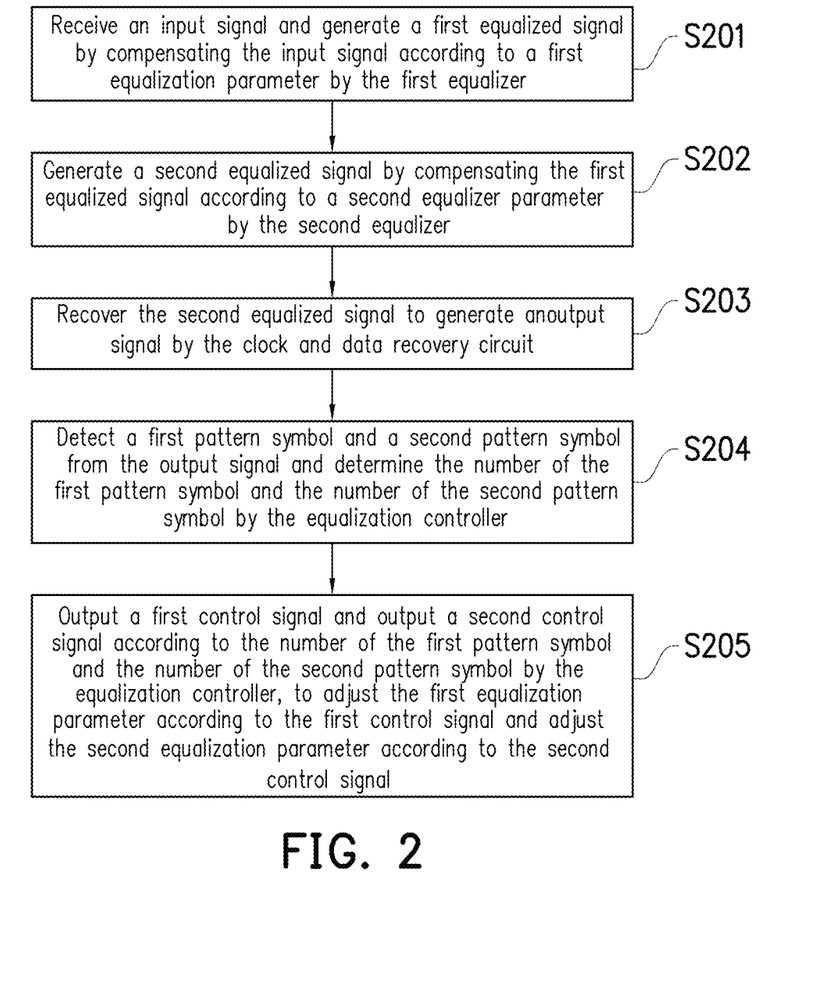
FIG. 2 is a flowchart illustrating an equalizer tuning method according to an embodiment of the invention.

FIG. 2 is a flowchart illustrating an equalizer tuning method according to an embodiment of the invention. The related implementation details of the equalizer tuning method and the related device features of the present embodiment may be obtained from the above descriptions of FIG. 1, and details thereof are not repeated.

Referring to FIG. 1 and FIG. 2 together, in step S201, an input signal Sin is received and a first equalized signal S1 is generated by compensating the input signal Sin according to a first equalization parameter by the first equalizer 110. In step S202, a second equalized signal S2 is generated by compensating the first equalized signal S1 according to a second equalizer parameter by the second equalizer 120. In step S203, the second equalized signal S2 is recovered to generate an output signal Sd by the clock and data recovery circuit 130. In step S204, a first pattern symbol and a second pattern symbol are detected from the output signal Sd and the number of the first pattern symbol and the number of the second pattern symbol in a counting period are determined by the equalization controller 140. In the present embodiment, the equalization controller 140 may determine how to adjust the second equalization parameter according to the number of the first pattern symbol and the number of the second pattern symbol. Therefore, in step S205, a first control signal Ctrl1 is outputted and a second control signal Ctrl2 is outputted according to the number of the first pattern symbol and the number of the second pattern symbol by the equalization controller 140, and the first equalization parameter is adjusted according to the first control signal Ctrl1 and the second equalization parameter is adjusted according to the second control signal Ctrl2.

Based on the descriptions of the exemplary embodiments of FIG. 1 and FIG. 2, through using the equalization controller 140 to simultaneously adjust the first equalization parameter of the first equalizer 110 and the second equalization parameter of the second equalizer 120 in one single phase, the signal receiving device 10 in the embodiments of the invention would not need to separately tune the first equalizer 110 and the second equalizer 120 in two phases, thereby shortening the lock time for locking the adaptive equalization parameters.

Exemplary embodiments are provided below to clearly illustrate the detailed adjusting method of the first equalization parameter and the second equalization parameter.

Figure 3:
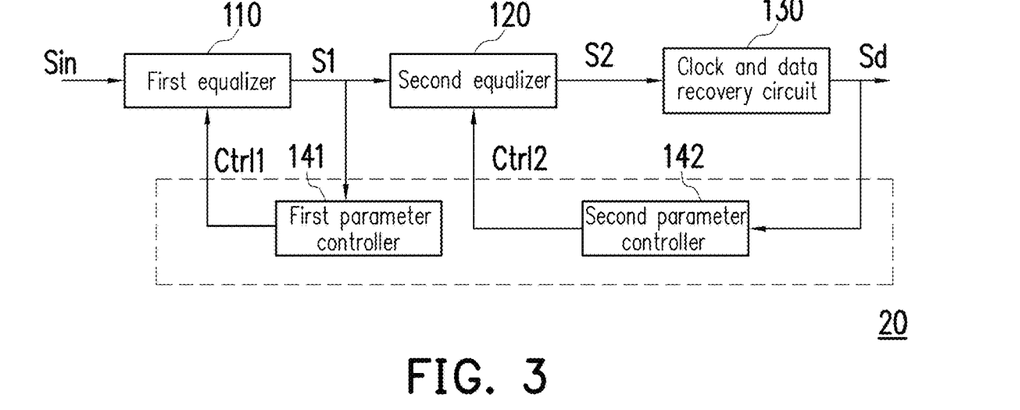
FIG. 3 is a block diagram of a signal receiving device according to an embodiment of the invention.

FIG. 3 is a block diagram of a signal receiving device according to an embodiment of the invention. Referring to FIG. 3, the signal receiving device 20 includes the first equalizer 110, the second equalizer 120, the clock and data recovery circuit 130, and the equalization controller 140. In the present Exemplary embodiment, the equalization controller 140 includes the first parameter controller 141 and the second parameter controller 142.

The first parameter controller 141 receives the first equalized signal S1 and outputs the first control signal Ctrl1, to adjust the first equalization parameter of the first equalizer 110 by the first control signal Ctrl1. It should be noted that, in one embodiment, the first parameter controller 141 may include an eye-pattern monitor configured to measure eye-pattern information of the first equalized signal S1 and adjust the first equalization parameter according to the eye-pattern information of the first equalized signal S1. Alternatively, in another embodiment, the first parameter controller 141 may detect the third pattern symbol and the forth pattern symbol from the first equalized signal S1 and adjust the first equalization parameter according to the number of the third pattern symbol and the number of the forth pattern symbol. That is, the compensation intensity of the first equalizer 110 may be adjusted through measuring the eye-pattern information of the first equalized signal S1 or through searching the specific pattern symbols from the sampling result of the first equalized signal S1.

It should be noted that, the second parameter controller 142 may adjust the second equalization parameter while the first parameter controller 141 is adjusting the first equalization parameter. The second parameter controller 142 receives the output signal Sd and outputs the second control signal Ctrl2 accordingly to adjust the second equalization parameter of the second equalizer 120 according to the second control signal Ctrl2. In the present exemplary embodiment, the second parameter controller 142 may detect the first pattern symbol and the second pattern symbol from the output signal Sd and adjust the second equalization parameter according to the number of the first pattern symbol and the number of the second pattern symbol. That is, the compensation intensity of the second equalizer 120 may be adjusted through searching the specific pattern symbols from the sampling result of the output signal Sd.

Figure 4:
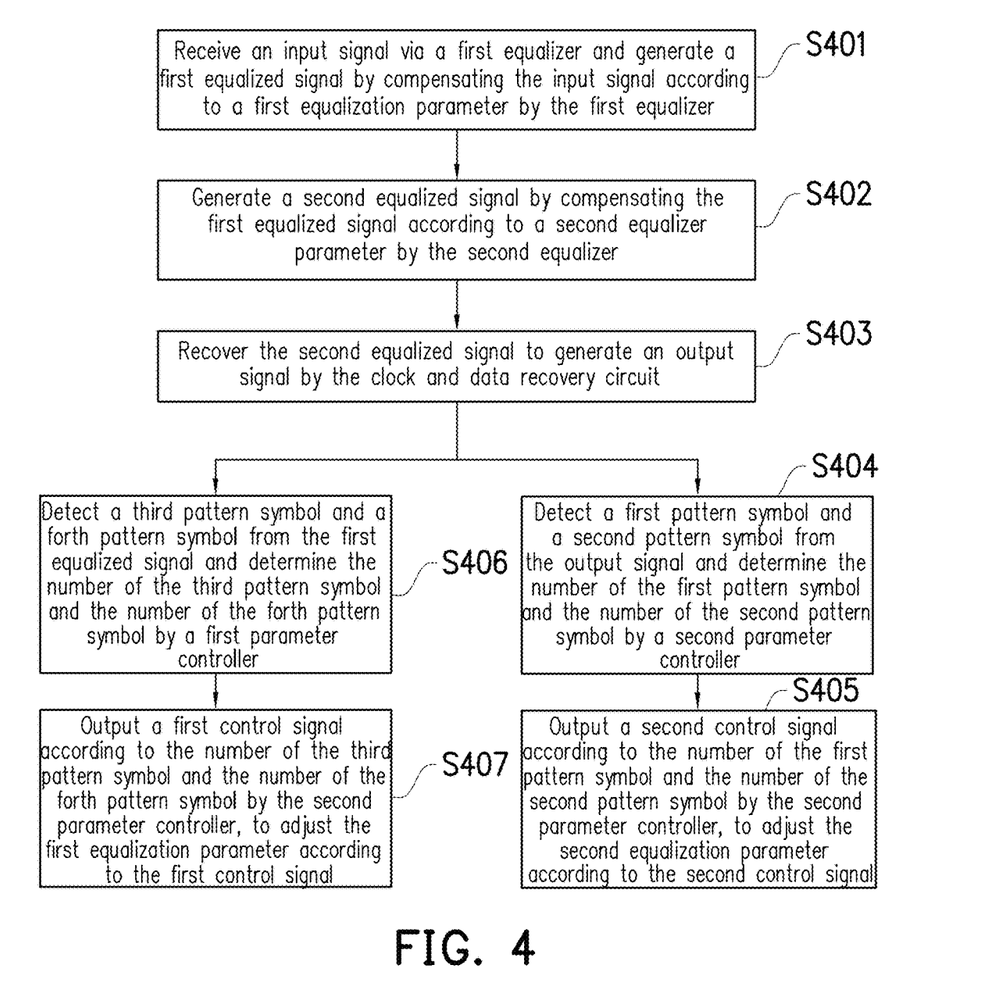
FIG. 4 is a flowchart illustrating an equalization parameter adjusting method according to an embodiment of the invention.

FIG. 4 is a flowchart illustrating an equalization parameter adjusting method according to an embodiment of the invention. The method of this embodiment is adapted for the signal receiving device 20 of FIG. 3. Each step of the method of this embodiment is explained in detail hereinafter with reference to the components of the signal receiving device 20.

In step S401, an input signal Sin is received and a first equalized signal S1 is generated by compensating the input signal Sin according to a first equalization parameter by the first equalizer 110. In step S402, a second equalized signal S2 is generated by compensating the first equalized signal S1 according to a second equalizer parameter by the second equalizer 120. In step S403, the second equalized signal S2 is recovered to generate an output signal Sd by the clock and data recovery circuit 130.

In step S404, a first pattern symbol and a second pattern symbol are detected from the output signal and the number of the first pattern symbol and the number of the second pattern symbol are determined by a second parameter controller 142. Herein, the second parameter controller 142 may determine how to adjust the second equalization parameter according to the number of the first pattern symbol and the number of the second pattern symbol. In step S405, a second control signal Ctrl2 is outputted according to the number of the first pattern symbol and the number of the second pattern symbol by the second parameter controller 142, and the second equalization parameter is adjusted according to the second control signal Ctrl2.

In the present exemplary embodiment, the second parameter controller 142 may determine whether to adjust the second equalization parameter of the second equalizer 120 according to an absolute difference between the number of the first pattern symbol and the number of the second pattern symbol in the counting period. Besides, the second parameter controller 142 may determine whether the signal compensation performed by the second equalizer 120 is insufficient or excessive according to the number of the first pattern symbol and the number of the second pattern symbol, so as to adjust the second equalization parameter of the second equalizer 120 accordingly.

While step S404 to step S405 are performed, in step S406, a third pattern symbol and a forth pattern symbol are detected from the first equalized signal S1 and the number of the third pattern symbol and the number of the forth pattern symbol are determined by a first parameter controller 141. Herein, the first parameter controller 141 may determine how to adjust the first equalization parameter according to the number of the third pattern symbol and the number of the forth pattern symbol.

In step S407, a first control signal Ctrl1 is outputted according to the number of the third pattern symbol and the number of the forth pattern symbol by the first parameter controller 141, and the first equalization parameter is adjusted according to the first control signal Ctrl1. That is, the first parameter controller 141 may perform sampling on the first equalized signal S1 first and determine whether the third pattern symbol and the forth pattern symbol exist in the sampled bit sequence in the counting period, and thus the first parameter controller 141 may adjust the first equalization parameter according to the number of the third pattern symbol and the number of the forth pattern symbol.

Similarly, in the present exemplary embodiment, the first parameter controller 141 may determine whether to adjust the first equalization parameter of the first equalizer 110 according to an absolute difference between the number of the third pattern symbol and the number of the forth pattern symbol in the counting period. Besides, the first parameter controller 141 may determine whether the signal compensation performed by the first equalizer 110 is insufficient or excessive according to the number of the third pattern symbol and the number of the forth pattern symbol, so as to adjust the first equalization parameter of the first equalizer 110 accordingly.

Figure 5:
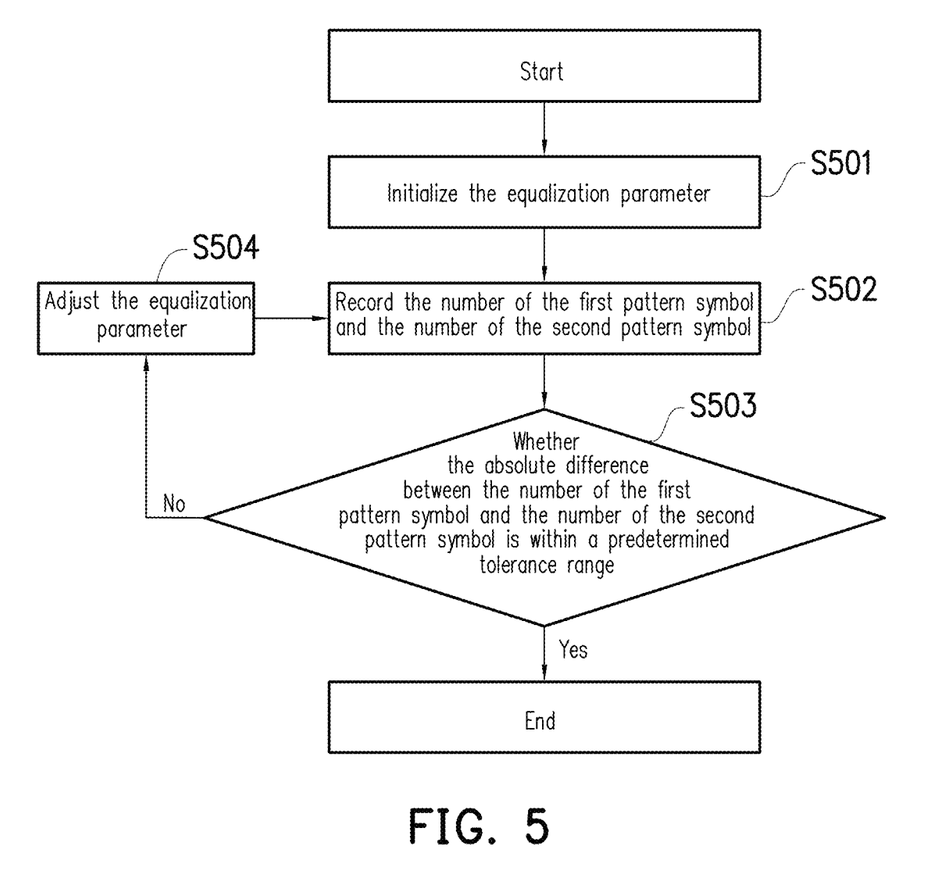
FIG. 5 is a flowchart illustrating a method of adjusting the equalization parameter by searching specific symbols according to an embodiment of the invention.

In detail, FIG. 5 is a flowchart illustrating a method of adjusting the equalization parameter by searching specific symbols according to an embodiment of the invention. The second parameter controller 142 will be described with reference to FIG. 5 below. Referring to FIG. 5, in step S501, the second parameter controller 142 initialize the second equalization parameter. In step S502, the second parameter controller 142 records the number of the first pattern symbol and the number of the second pattern symbol in the output signal Sd. Specifically, since the data bits of the output signal Sd are continually inputted into the second parameter controller 142, the second parameter controller 142 may detect whether the first pattern symbol and the second pattern symbol exist in the collected bit sequence in the counting period. In response to searching out the first pattern symbol and the second pattern symbol, the second parameter controller 142 records the number of the first pattern symbol and the number of the second pattern symbol.

In one embodiment, the first pattern symbol is composed of a plurality of first data bits arranged in sequence, and each first data bit may be one-bit '0' or '1'. In the embodiments of the invention, the first data bits constituting the first pattern symbol are identical with each other. For example, the first pattern symbol may be 3-bit '000' or '111'. In addition, the second pattern symbol is composed of a plurality of second data bits arranged in sequence, and each second data bit may be one-bit '0' or '1'. In the embodiments of the invention, a start data bit among the second data bits constituting the second pattern symbol is identical with an end data bit among the second data bits, and a middle data bit among the second data bits constituting the second pattern symbol is different from the start data bit among the second data bits. For example, the second pattern symbol may be 3-bit '010' or '101'. Next, in step S503, the second parameter controller 142 may determine whether the absolute difference between the number of the first pattern symbol and the number of the second pattern symbol in the counting period is within a predetermined tolerance range. The predetermined tolerance range is a numerical range formed by an upper limit value and a lower limit value. The upper limit value and the lower limit value may be properly designed depending on the actual need.

If the absolute difference between the number of the first pattern symbol and the number of the second pattern symbol in the counting period is within the predetermined tolerance range (step S503 is determined as 'yes'), the second parameter controller 142 does not adjust the equalization parameter (i.e., the second equalization parameter). On the other hand, if the absolute difference between the number of the first pattern symbol and the number of the second pattern symbol in the counting period is not within the predetermined tolerance range (step S503 is determined as 'no'), which refers to the absolute difference between the number of the first pattern symbol and the number of the second pattern symbol in the counting period falls outside the predetermined tolerance range, in step S504, the second parameter controller 142 adjusts the equalization parameter (i.e., the second equalization parameter).

Figure 6A:
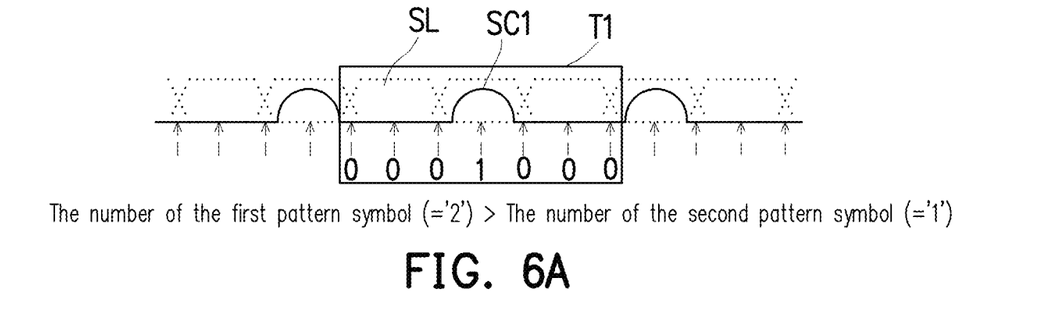
FIG. 6A to 6C are examples of searching a first pattern symbol and a second pattern symbol under different compensation statuses according to an embodiment of the invention.
Figure 6B:
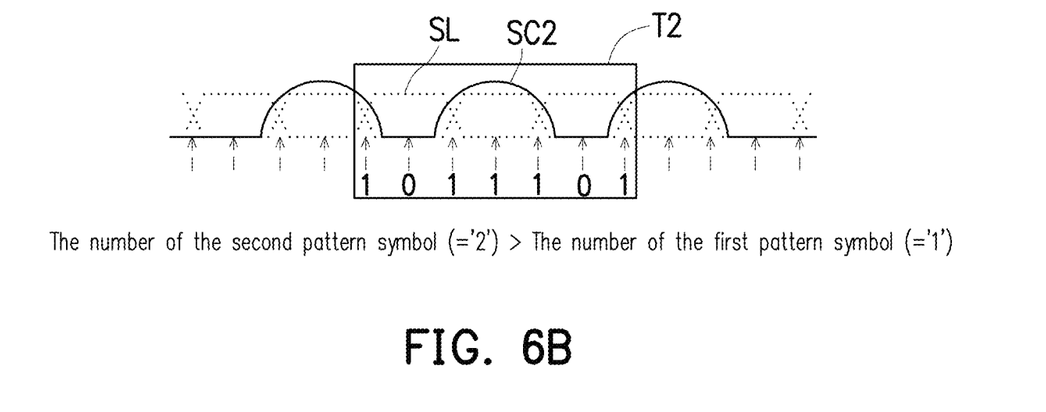
Figure 6C:
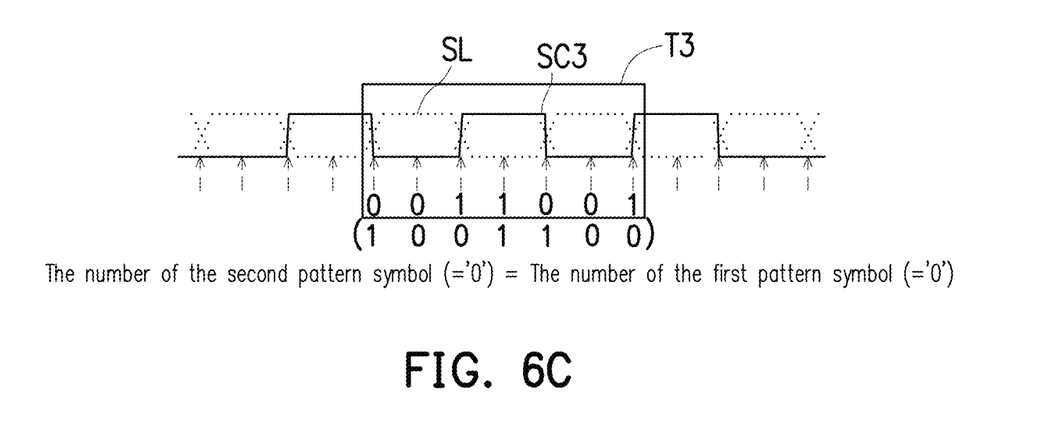

FIG. 6A to 6C are examples of searching a first pattern symbol and a second pattern symbol under different compensation statuses according to an embodiment of the invention. The second parameter controller 142 will be described with reference to FIG. FIG. 6A to 6C below.

In FIG. 6A to 6C, the actual signals outputted by the clock and data recovery circuit 130 are indicated by a solid line (e.g., SC1-SC3), and the ideal desired signal is indicated by a dot line (e.g., SL). For the purpose of ease and convenience in explanation and illustration, the first pattern symbol is assumed as '000' or '111' in the present embodiment; the second pattern symbol is assumed as '010' or '101'; and the example is illustrated with reference to the predetermined tolerance range which is assumed as a numerical range with '−1' as the lower limit value and '1' as the upper limit value. However, FIG. 6A to 6C are merely examples for illustrating principles of the invention, and the invention is not limited thereto. The first pattern symbol, the second pattern symbol and the predetermined tolerance range may be designed by other appropriate manners according different design considerations. Besides, it should be noted that, in the present exemplary embodiment, the condition of which the absolute difference equals to the lower limit value and the upper limit value of the predetermined tolerance range is excluded from the condition of which the absolute difference between the number of the first pattern symbol and the number of the second pattern symbol is within the predetermined tolerance range. That is, the second parameter controller 142 may determine whether the absolute difference is within the predetermined tolerance range based on a following mathematical formula: {lower limit value<absolute difference<upper limit value}, so as to determine whether to adjust the second equalization parameter.

Referring to FIG. 6A, the clock and data recovery circuit 130 samples the actual signal SC1 in the counting period T1, and the sampling result is '0001000'. Next, by searching the bit sequence '0001000', the second parameter controller 142 determines whether the bit sequence '0001000' includes the first pattern symbol '000' or '111' and the second pattern symbol '010' or '101'. Since the bit sequence '0001000' includes two first pattern symbols '000' and one second pattern symbol '010', the second parameter controller 142 may determine the absolute difference between the number of the first pattern symbol and the number of the second pattern symbol in the counting period equals to '1' and thus is not within the predetermined tolerance range. Therefore, the compensation intensity of the second equalizer 120 is tuned by adjusting the second equalization parameter correspondingly. Specifically, in the present embodiment, based on the first pattern symbol including three first data bits of which bit values are identical (i.e., '000' or '111') and the second pattern symbol including three second data bits of which bit values are interlacedly different (i.e., '010' or '101'), this case where the number of the first pattern symbol is greater than the number of the second pattern symbol shows that the actual signal SC1 is compensated inefficiently. Therefore, the second parameter controller 142 may accordingly adjust the second equalization parameter to achieve the purpose of enhancing the compensation intensity of the second equalizer 120.

Referring to FIG. 6B, the clock and data recovery circuit 130 samples the actual signal SC2 in the counting period T2, and the sampling result is '1011101'. Next, by searching the bit sequence '1011101', the second parameter controller 142 determines whether the bit sequence '1011101' includes the first pattern symbol '000' or '111' and the second pattern symbol '010' or '101'. Since the bit sequence '1011101' includes one first pattern symbol '111' and two second pattern symbols '010', the second parameter controller 142 may determine the absolute difference between the number of the first pattern symbol and the number of the second pattern symbol in the counting period equals to '1' and thus is not within the predetermined tolerance range. Therefore, the compensation intensity of the second equalizer 120 is tuned by adjusting the second equalization parameter correspondingly. Specifically, in the present embodiment, based on the first pattern symbol including three first data bits of which bit values are identical (i.e., '000' or '111') and the second pattern symbol including three second data bits of which bit values are interlacedly different (i.e., '010' or '101'), this case where the number of the first pattern symbol is less than the number of the second pattern symbol shows that the actual signal SC2 is compensated excessively. Therefore, the second parameter controller 142 may accordingly adjust the second equalization parameter to achieve the purpose of reducing the compensation intensity of the second equalizer 120.

Referring to FIG. 6C, the clock and data recovery circuit 130 samples the actual signal SC3 in the counting period T3, and the sampling result is '1001100' (or '0011001'). By searching the bit sequence '1001100' (or '0011001'), the second parameter controller 142 determines whether the bit sequence '1001100' (or '0011001') includes the first pattern symbol '000' or '111' and the second pattern symbol '010' or '101'. Since the bit sequence '1001100' (or '0011001') does not includes any first pattern symbol or any second pattern symbols, the second parameter controller 142 may determine that the absolute difference between the number of the first pattern symbol and the number of the second pattern symbol in the counting period equals to '0' and thus is within the predetermined tolerance range. Therefore, the second equalization parameter is not adjusted correspondingly. Specifically, in the present embodiment, based on the first pattern symbol including three first data bits of which bit values are identical (i.e., '000' or '111') and the second pattern symbol including three second data bits of which bit values are interlacedly different (i.e., '010' or '101'), this case where the number of the first pattern symbol equals to the number of the second pattern symbol shows that the actual signal SC2 is compensated ideally and correctly. Therefore, the second parameter controller 142 may not adjust the second equalization parameter to achieve the purpose of maintaining the compensation intensity of the second equalizer 120.

Besides, based on the examples of FIG. 6A to FIG. 6C, the second parameter controller 142 may also determine whether to adjust the second equalization parameter through determining whether the number of the first pattern symbol equals to the number of the second pattern symbol in the counting period. When the number of the first pattern symbol equals to the number of the second pattern symbol in the counting period (shown in FIG. 6C), the second parameter controller 142 does not adjust the second equalization parameter. When the number of the first pattern symbol does not equal to the number of the second pattern symbol in the counting period (shown in FIGS. 6A and 6B), the second parameter controller 142 adjusts the second equalization parameter.

It should be noted that, the operation and the principle for tuning the first parameter controller 141 are similar to the operation and the principle for tuning the second parameter controller 142, and thus the implement detail can be derived according to descriptions of FIG. 5 and FIG. 6. That is, based on the flowchart of FIG. 5, the first parameter controller 141 may initialize the first equalization parameter and then records the number of the third pattern symbol and the number of the forth pattern symbol in the first equalized signal S1. In response to searching out the third pattern symbol and the forth pattern symbol, the first parameter controller 141 may records the number of the third pattern symbol and the number of the forth pattern symbol. Afterward, the first parameter controller 141 determines whether an absolute difference between the number of the third pattern symbol and the number of the forth pattern symbol in the counting period is within a predetermined tolerance range. The first parameter controller 141 does not adjust the first equalization parameter if the absolute difference between the number of the third pattern symbol and the number of the forth pattern symbol in the counting period is within a predetermined tolerance range. In the other hand, the first parameter controller 141 adjusts the first equalization parameter if the absolute difference between the number of the third pattern symbol and the number of the forth pattern symbol in the counting period is not within a predetermined tolerance range. That is, both of the first parameter controller 141 and the second parameter controller 142 may adjust the equalization parameters by searching the specific pattern symbols. In addition, the period length of the counting period used by the first parameter controller 141 may be identical with or different from the period length of the counting period used by the second parameter controller 142.

Figure 7:
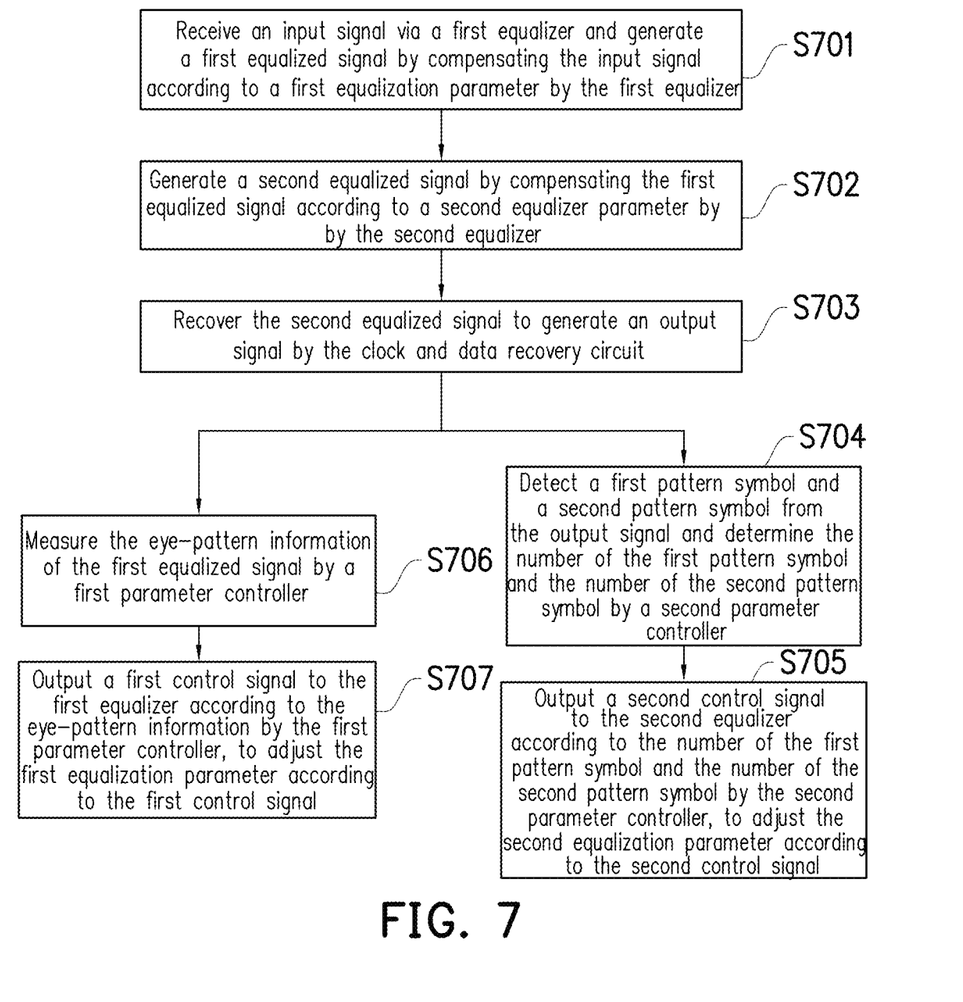
FIG. 7 is a flowchart illustrating an equalization parameter adjusting method according to an embodiment of the invention.

FIG. 7 is a flowchart illustrating an equalization parameter adjusting method according to an embodiment of the invention. The method of this embodiment is adapted for the signal receiving device 20 of FIG. 3. Each step of the method of this embodiment is explained in detail hereinafter with reference to the components of the signal receiving device 20.

In step S701, an input signal Sin is received and a first equalized signal S1 is generated by compensating the input signal Sin according to a first equalization parameter by the first equalizer 110. In step S702, a second equalized signal S2 is generated by compensating the first equalized signal S1 according to a second equalizer parameter by the second equalizer 120. In step S703, the second equalized signal S2 is recovered to generate an output signal Sd by the clock and data recovery circuit 130. In step S704, a first pattern symbol and a second pattern symbol are detected from the output signal and the number of the first pattern symbol and the number of the second pattern symbol are determined by a second parameter controller 142. Herein, the second parameter controller 142 may determine how to adjust the second equalization parameter according to the number of the first pattern symbol and the number of the second pattern symbol. In step S705, a second control signal Ctrl2 is outputted according to the number of the first pattern symbol and the number of the second pattern symbol by the second parameter controller 142, and the second equalization parameter is adjusted according to the second control signal Ctrl2. Principles and operations of the step S701 to S705 are similar with principles and operations of the step S401 to S405.

The difference between the embodiment of FIG. 7 and the embodiment of FIG. 4 is that the manner for adjusting the equalization parameter by the first parameter controller 141 is different from the manner for adjusting the equalization parameter by the second parameter controller 142. In the embodiment of FIG. 7, while performing step S704 to step S705, in step S706, the eye-pattern information of the first equalized signal S1 is measured by the first parameter controller 141. Herein, the first parameter controller 141 may determine how to adjust the first equalization parameter according to the eye-pattern information. In step S706, the first control signal Ctrl1 is outputted to the first equalizer 110 according to the eye-pattern information by the first parameter controller 141, and the first equalization parameter is adjusted according to the first control signal Ctrl1.

Figure 8:
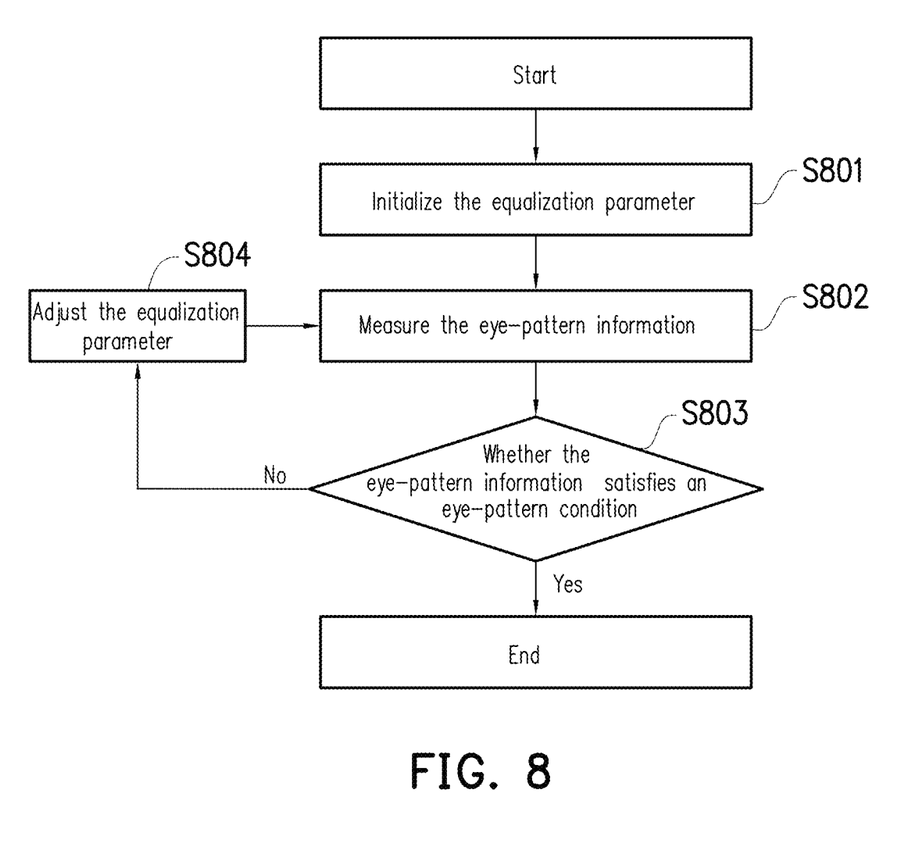
FIG. 8 is a flowchart illustrating a method of adjusting the equalization parameter according to the eye-pattern information according to an embodiment of the invention.

In the present embodiment, the first parameter controller 141 may adjust the first equalization parameter by measuring the eye-pattern information of the first equalized signal S1. In detail, referring to FIG. 8, FIG. 8 is a flowchart illustrating a method of adjusting the equalization parameter according to the eye-pattern information according to an embodiment of the invention. In step S801, the first parameter controller 141 initializes the first equalization parameter. In step S802, the first parameter controller 141 measures the eye-pattern information of the first equalized signal S1. In step S803, the first parameter controller 141 may determine whether the eye-pattern information satisfies an eye-pattern condition. If the eye-pattern information does not satisfy the eye-pattern condition (step S803 is determined as 'No'), step S804 is performed and thus the first parameter controller 141 adjusts the first equalization parameter. If the eye-pattern information satisfies the eye-pattern condition (step S803 is determined as 'Yes'), the first parameter controller 141 does not adjust the first equalization parameter.

Figure 9:
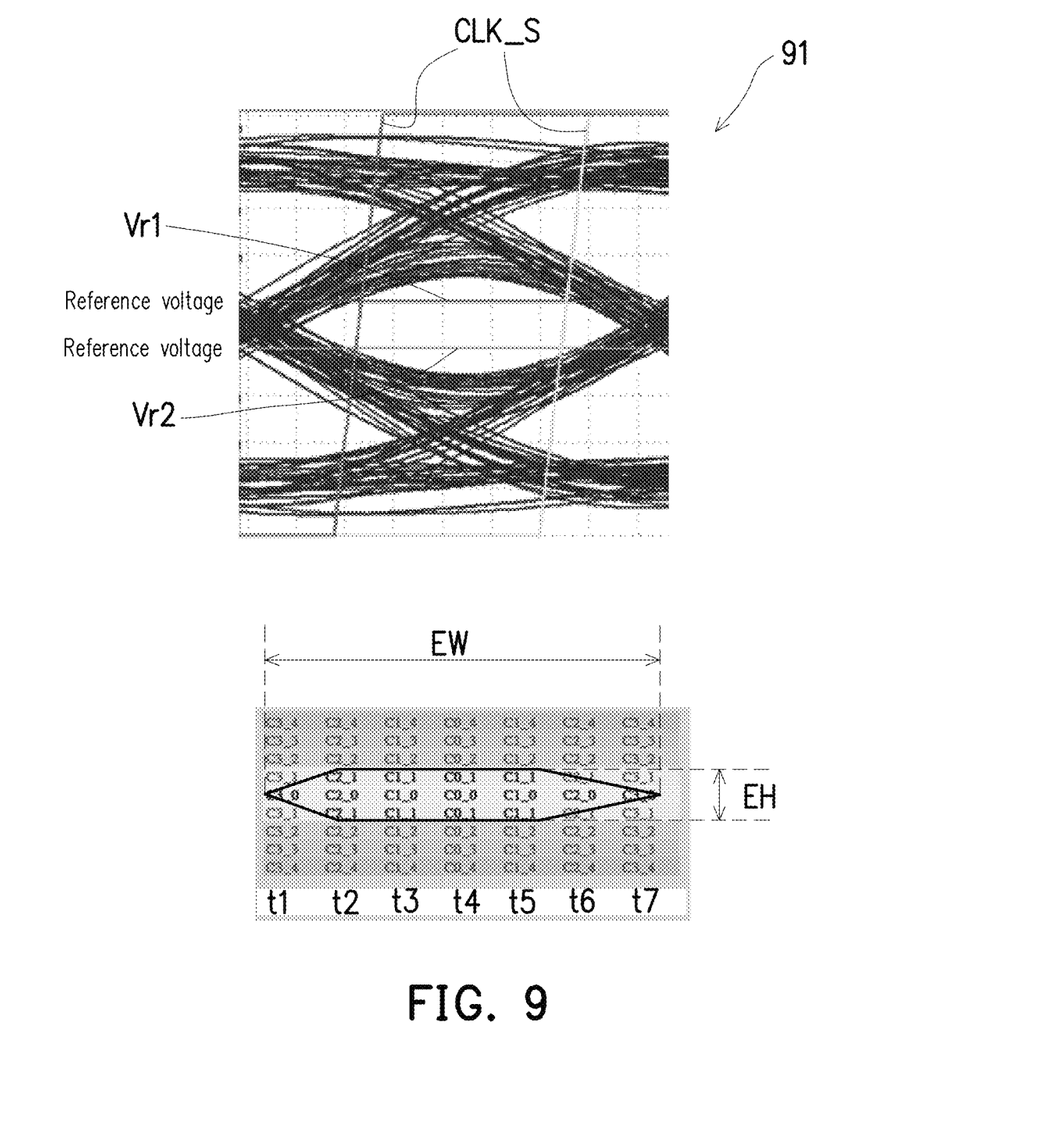
FIG. 9 is an example of eye-pattern information according to an embodiment of the invention.

FIG. 9 is an example of eye-pattern information according to an embodiment of the invention. Referring to FIG. 9, it is assumed that the first parameter controller 141 measures the differential signal eye diagram 91 of the first equalized signal S1. The first parameter controller 141 samples the differential signals in the differential signal eye diagram 91 at multiple sampling time points t1-t7 by using a scan clock CLK_S, and the sampled signal values are compared with a reference voltage Vr1 and a reference voltage Vr2. By comparing the sampled signal values with the reference voltage Vr1 and the reference voltage Vr2, the first parameter controller 141 can obtain an eye-height value EH and/or an eye-width value EW of the first equalized signal S1. The eye-height value EH and/or an eye-width value EW of the first equalized signal S1 may be referred as the eye-pattern information of the first equalized signal S1. Hence, in one embodiment, the first parameter controller 141 may determine whether the eye-height value EH is greater than or equal to an eye-height threshold and/or may determine whether the eye-width value EW is greater than or equal to an eye-width threshold, so as to determine whether the eye-pattern information of the first equalized signal S1 satisfies the eye-pattern condition. It is known that, the signal quality of the first equalized signal S1 which has been compensated is still poor if the eye-height value EH of the first equalized signal S1 is overly narrow or the eye-width value EW of the first equalized signal S1 is overly narrow. Hence, the first parameter controller 141 needs to continually adjust the first equalization parameter if the eye-pattern of the first equalized signal S1 does not satisfy the eye-pattern condition.

However, after referring to the descriptions of FIG. 3, FIG. 4 and FIG. 7, the first equalization parameter of the first equalizer 110 is adjusted according to the first equalized signal S1, and the second equalization parameter of the second equalizer 120 is adjusted according to the output signal Sd. Besides, the first parameter controller 141 and the second parameter controller 142 may respectively adjust the first equalization parameter and the second equalization parameter according to the same or different operation principle(s). For example, both of the first parameter controller 141 and the second parameter controller 142 may adjust the equalization parameters according to the flow shown by FIG. 5; otherwise, the second parameter controller 142 may adjust the equalization parameter according to the flow shown by FIG. 5, but the first parameter controller 141 may adjust the equalization parameter according to the flow shown by FIG. 8.

Figure 10:
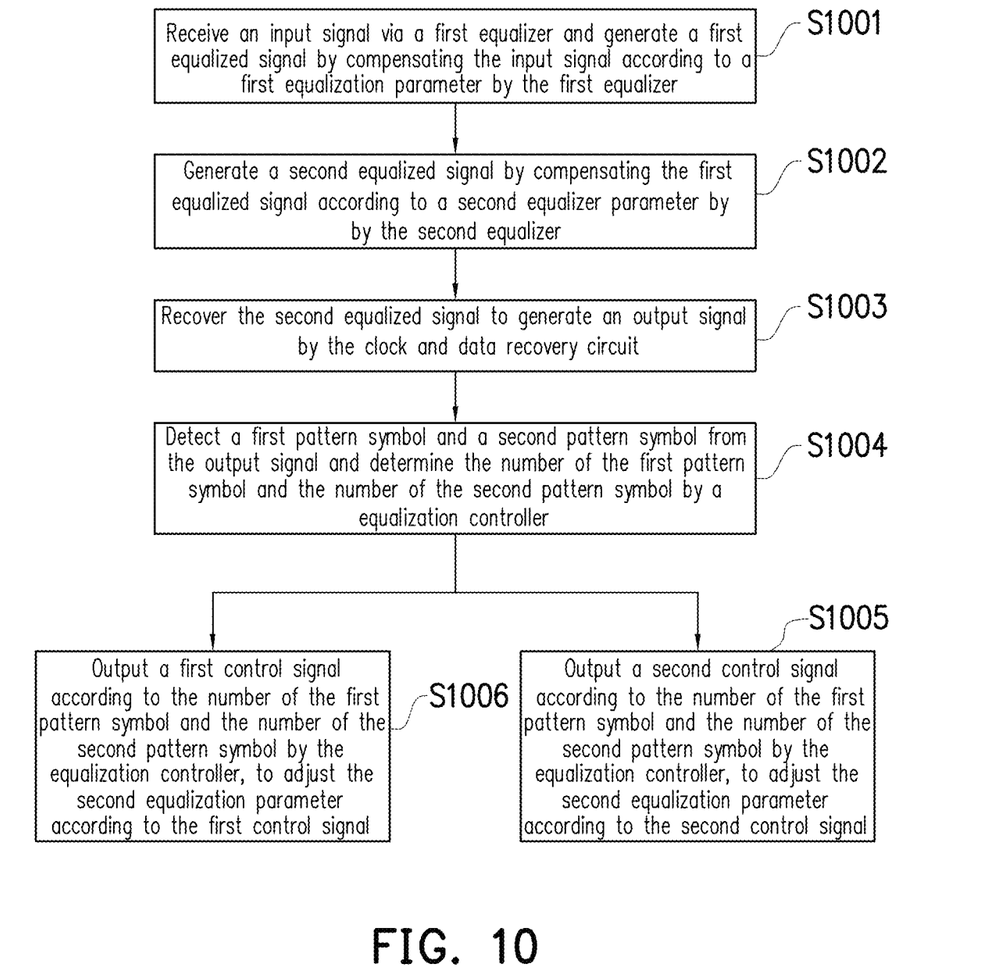
FIG. 10 is a flowchart illustrating an equalization parameter adjusting method according to an embodiment of the invention.

FIG. 10 is a flowchart illustrating an equalization parameter adjusting method according to an embodiment of the invention. The method of this embodiment is adapted for the signal receiving device 10 of FIG. 1. Each step of the method of this embodiment is explained in detail hereinafter with reference to the components of the signal receiving device 10.

Referring to FIG. 10, in step S1001, an input signal Sin is received and a first equalized signal S1 is generated by compensating the input signal Sin according to a first equalization parameter by the first equalizer 110. In step S1002, a second equalized signal S2 is generated by compensating the first equalized signal S1 according to a second equalizer parameter by the second equalizer 120. In step S1003, the second equalized signal S2 is recovered to generate an output signal Sd by the clock and data recovery circuit 130.

It should be stated that, in the exemplary embodiment of FIG. 10, both of the first equalization parameter of the first equalizer 110 and the second equalization parameter of the second equalizer 120 are adjusted according to the output signal Sd. In step S1004, a first pattern symbol and a second pattern symbol are detected from the output signal Sd and the number of the first pattern symbol and the number of the second pattern symbol are determined by a equalization controller 140. Herein, the equalization controller 140 may adjust the first equalization parameter and the second equalization parameter according to the number of the first pattern symbol and the number of the second pattern symbol at the same time. The equalization controller 140 may, for example, adjust the two equalization parameters (i.e., the first equalization parameter and the second equalization parameter) according to the flow shown by FIG. 5. Next, in step S1005, a second control signal Ctrl2 is outputted according to the number of the first pattern symbol and the number of the second pattern symbol by the equalization controller 140, and the second equalization parameter is adjusted according to the second control signal Ctrl2. In step S1006, a first control signal Ctrl1 is outputted according to the number of the first pattern symbol and the number of the second pattern symbol by the equalization controller 140, and the first equalization parameter is adjusted according to the first control signal Ctrl1.

In summary, in the embodiments of the invention, the first equalizer and the second equalizer in the signal receiving device may respectively compensate the channel effect of the inputted signal according to the first equalization parameter and the second equalization parameter. The first equalization parameter of the first equalizer and the second equalization parameter of the second equalizer may be respectively determined and adjusted independently, so as to upgrade the tuning accuracy of the equalizer. Further, in the embodiments of the invention, the adjustment of the first equalization parameter and the second equalization parameter would not be limited by the transmission specifications, and thus may be compatible with different transmission specifications. Such that, the utilization of the equalizer is more flexible and not be limited. In addition, the equalization controller may simultaneously tune the equalizer and the second equalizer in one single phase, thereby rapidly achieving optimization of signal compensation and shortening the lock time for adjusting the equalization parameter to the optimum value.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A signal receiving device, comprising:
a first equalizer, receiving an input signal, and generating a first equalized signal by compensating the input signal according to a first equalization parameter;
a second equalizer, coupled to the first equalizer, and generating a second equalized signal by compensating the first equalized signal according to a second equalization parameter;
a clock and data recovery circuit, coupled to the second equalizer, recovering the second equalized signal to generate an output signal; and
an equalization controller, receiving the output signal, and outputting a first control signal and a second control signal to adjust the first equalization parameter according to the first control signal and adjust the second equalization parameter according to the second control signal,
wherein the equalization controller detects at least one first pattern symbol and at least one second pattern symbol from the output signal and adjusts the second equalization parameter according to the number of the first pattern symbol and the number of the second pattern symbol in a counting period,
wherein the equalization controller comprises:
a first parameter controller, receiving the first equalized signal and outputting the first control signal to adjust the first equalization parameter by the first control signal; and
a second parameter controller, receiving the output signal and outputting the second control signal to adjust the second equalization parameter by the second control signal;
wherein the second parameter controller detects the first pattern symbol and the second pattern symbol from the output signal and adjusts the second equalization parameter according to the number of the first pattern symbol and the number of the second pattern symbol.

2. The signal receiving device as claimed in claim 1, wherein the first parameter controller detects a third pattern symbol and a forth pattern symbol from the first equalized signal and adjusts the first equalization parameter according to the number of the third pattern symbol and the number of the forth pattern symbol.

3. The signal receiving device as claimed in claim 1, wherein the first parameter controller comprises an eye-pattern monitor, and the first parameter controller measures eye-pattern information of the first equalized signal and adjusts the first equalization parameter according to the eye-pattern information.

4. The signal receiving device as claimed in claim 3, wherein the first parameter controller adjusts the first equalization parameter if the eye-pattern information does not satisfy an eye-pattern condition.

5. The signal receiving device as claimed in claim 1, wherein the second parameter controller adjusts the second equalization parameter while the first parameter controller adjusts the first equalization parameter.

6. The signal receiving device as claimed in claim 1, wherein the equalization controller adjusts the first equalization parameter according to the number of the first pattern symbol and the number of the second pattern symbol.

7. The signal receiving device as claimed in claim 1, wherein the equalization controller records the number of the first pattern symbol and the number of the second pattern symbol in the counting period and determines whether an absolute difference between the number of the first pattern symbol and the number of the second pattern symbol in the counting period is within a predetermined tolerance range.

8. The signal receiving device as claimed in claim 7, wherein the equalization controller does not adjust the second equalization parameter if the absolute difference between the number of the first pattern symbol and the number of the second pattern symbol in the counting period is within the predetermined tolerance range; and the equalization controller adjusts the second equalization parameter if the absolute difference between the number of the first pattern symbol and the number of the second pattern symbol in the counting period is not within the predetermined tolerance range.

9. The signal receiving device as claimed in claim 7, wherein the first pattern symbol is composed of a plurality of first data bits arranged in sequence, the second pattern symbol is composed of a plurality of second data bits arranged in sequence, the first data bits are identical, a start data bit among the second data bits is identical with an end data bit among the second data bits, and a middle data bit among the second data bits is different from the start data bit among the second data bits.

10. An equalizer tuning method, comprising:
receiving an input signal and generating a first equalized signal by compensating the input signal according to a first equalization parameter by a first equalizer;
generating a second equalized signal by compensating the first equalized signal according to a second equalization parameter by a second equalizer;
recovering the second equalized signal to generate an output signal by a clock and data recovery circuit;
detecting at least one first pattern symbol and at least one second pattern symbol from the output signal and adjusting the second equalization parameter according to the number of the first pattern symbol and the number of the second pattern symbol in a counting period by an equalization controller; and
outputting a first control signal and a second control signal by the equalization controller, to adjust the first equalization parameter according to the first control signal and adjust the second equalization parameter according to the second control signal,
wherein the step of outputting the first control signal and the second control signal by the equalization controller, to adjust the first equalization parameter according to the first control signal and adjust the second equalization parameter according to the second control signal comprises:
receiving the first equalized signal and outputting the first control signal by a first parameter controller to adjust the first equalization parameter according to the first control signal; and
receiving the output signal and outputting the second control signal by a second parameter controller to adjust the second equalization parameter according to the second control signal,
wherein the step of detecting the first pattern symbol and the second pattern symbol from the output signal and adjusting the second equalization parameter according to the number of the first pattern symbol and the number of the second pattern symbol in the counting period by the equalization controller comprises:
detecting the first pattern symbol and the second pattern symbol from the output signal and adjusting the second equalization parameter according to the number of the first pattern symbol and the number of the second pattern symbol by the second parameter controller.

11. The equalizer tuning method as claimed in claim 10, further comprises:
detecting a third pattern symbol and a forth pattern symbol from the first equalized signal and adjusting the first equalization parameter according to the number of the third pattern symbol and the number of the forth pattern symbol by the first parameter controller.

12. The equalizer tuning method as claimed in claim 10, wherein the first parameter controller comprises an eye-pattern monitor, and the method further comprises:
measuring eye-pattern information of the first equalized signal and adjusting the first equalization parameter according to the eye-pattern information by the first parameter controller.

13. The equalizer tuning method as claimed in claim 12, wherein the step of measuring the eye-pattern information of the first equalized signal and adjusting the first equalization parameter according to the eye-pattern information by the first parameter controller comprises:
adjusting the first equalization parameter by the first parameter controller if the eye-pattern information does not satisfy an eye-pattern condition.

14. The equalizer tuning method as claimed in claim 10, wherein the second equalization parameter is adjusted by the second parameter controller while adjusting the first equalization parameter by the first parameter controller.

15. The equalizer tuning method as claimed in claim 10, wherein the step of detecting the first pattern symbol and the second pattern symbol from the output signal and adjusting the second equalization parameter according to the number of the first pattern symbol and the number of the second pattern symbol by the equalization controller further comprises:
adjusting the first equalization parameter according to the number of the first pattern symbol and the number of the second pattern symbol by the equalization controller.

16. The equalizer tuning method as claimed in claim 10, wherein the step of detecting the first pattern symbol and the second pattern symbol from the output signal and adjusting the second equalization parameter according to the number of the first pattern symbol and the number of the second pattern symbol by the equalization controller comprises:
recording the number of the first pattern symbol and the number of the second pattern symbol in the counting period and determining whether an absolute difference between the number of the first pattern symbol and the number of the second pattern symbol in the counting period is within a predetermined tolerance range by the equalization controller.

17. The equalizer tuning method as claimed in claim 16, wherein the step of detecting the first pattern symbol and the second pattern symbol from the output signal and adjusting the second equalization parameter according to the number of the first pattern symbol and the number of the second pattern symbol by the equalization controller further comprises:
not adjusting the second equalization parameter by the equalization controller further if the absolute difference between the number of the first pattern symbol and the number of the second pattern symbol in the counting period is within the predetermined tolerance range; and
adjusting the second equalization parameter by the equalization controller if the absolute difference between the number of the first pattern symbol and the number of the second pattern symbol in the counting period is not within the predetermined tolerance range.

18. The equalizer tuning method as claimed in claim 16, wherein the first pattern symbol is composed of a plurality of first data bits arranged in sequence, the second pattern symbol is composed of a plurality of second data bits arranged in sequence, the first data bits are identical, a start data bit among the second data bits is identical with an end data bit among the second data bits, and a middle data bit among the second data bits is different from the start data bit among the second data bits.

19. A signal receiving device, comprising:
- a first equalizer, receiving an input signal, and generating a first equalized signal by compensating the input signal according to a first equalization parameter;
- a second equalizer, coupled to the first equalizer, and generating a second equalized signal by compensating the first equalized signal according to a second equalization parameter;
- a clock and data recovery circuit, coupled to the second equalizer, recovering the second equalized signal to generate an output signal; and
- an equalization controller, receiving the output signal, and outputting a first control signal and a second control signal to adjust the first equalization parameter according to the first control signal and adjust the second equalization parameter according to the second control signal,
- wherein the equalization controller detects at least one first pattern symbol and at least one second pattern symbol from the output signal and adjusts the second equalization parameter according to the number of the first pattern symbol and the number of the second pattern symbol in a counting period,
- wherein the equalization controller records the number of the first pattern symbol and the number of the second pattern symbol in the counting period and determines whether an absolute difference between the number of the first pattern symbol and the number of the second pattern symbol in the counting period is within a predetermined tolerance range.

* * * * *